US009481503B2

(12) United States Patent
Chiang et al.

(10) Patent No.: US 9,481,503 B2
(45) Date of Patent: Nov. 1, 2016

(54) USE OF ADSORBER MATERIAL TO RELIEVE VACUUM IN SEALED CONTAINER CAUSED BY COOLING OF HEATED CONTENTS

(71) Applicant: PepsiCo, Inc., Purchase, NY (US)

(72) Inventors: Weilong L. Chiang, Naperville, IL (US); Paul Lunn, Brookfield, CT (US); Clarence Sequeira, New Milford, CT (US); Edward Peter Socci, Stewartsville, NJ (US)

(73) Assignee: PepsiCo, Inc., Chicago, IL (US)

( * ) Notice: Subject to any disclaimer, the term of this patent is extended or adjusted under 35 U.S.C. 154(b) by 534 days.

(21) Appl. No.: 13/629,720

(22) Filed: Sep. 28, 2012

(65) Prior Publication Data

US 2014/0090744 A1 Apr. 3, 2014

(51) Int. Cl.

*B65D 81/00* (2006.01)
*A23L 2/00* (2006.01)
*B65D 81/20* (2006.01)
*B65B 31/00* (2006.01)
*B67C 7/00* (2006.01)

(Continued)

(52) U.S. Cl.

CPC ......... *B65D 81/2076* (2013.01); *B65B 31/006* (2013.01); *B65D 51/24* (2013.01); *B67C 7/00* (2013.01); *B67C 2003/226* (2013.01); *B67C 2007/0066* (2013.01)

(58) Field of Classification Search

CPC B65D 85/73; B65D 81/2076; B65D 1/0207; B65D 81/28; B65D 41/00; B65D 51/244; B65D 81/2023; B65D 81/26; B65D 81/266; B65D 81/268; B65D 83/625; B65D 83/643; B65B 25/001; B65B 3/00; A23L 2/54; A23L 2/52; A23L 2/44; A23L 2/40

USPC .......... 53/440, 432, 400, 434, 471, 485, 426

See application file for complete search history.

(56) References Cited

U.S. PATENT DOCUMENTS 3,888,998 A 6/1975 Sampson et al.
3,949,038 A * 4/1976 McChesney et al. ........ 264/535

(Continued)

FOREIGN PATENT DOCUMENTS

CN 1925755 B 8/2011
WO 02/40368 A1 5/2002
WO 2012/023030 A2 2/2012

OTHER PUBLICATIONS

International Search Report and Written Opinion for PCT/US2013/058377 mailed Feb. 11, 2014.

(Continued)

*Primary Examiner* — Andrew M Tecco
*Assistant Examiner* — Chelsea Stinson
(74) *Attorney, Agent, or Firm* — Sterne, Kessler, Goldstein & Fox P.L.L.C.

(57) ABSTRACT

An adsorber material element is used relieve a vacuum that results from cooling of heated contents in a sealed container. An interior volume of that container may be filled or partially filled with a heated material. After the at least partially filled container is sealed, one or more gases may be released from an adsorber material and into the interior volume of the sealed container. As the contents of the container cool, the release of gas(es) from the adsorber material relieves vacuum that would otherwise develop.

17 Claims, 10 Drawing Sheets

(51) Int. Cl.
*B65D 51/24* (2006.01)
*B67C 3/22* (2006.01)

(56) References Cited

U.S. PATENT DOCUMENTS

| | | | | |
|---|---|---|---|---|
| 4,007,134 | A | 2/1977 | Liepa et al. | |
| 4,025,655 | A | 5/1977 | Whyte et al. | |
| 4,110,255 | A | 8/1978 | Liepa et al. | |
| 4,147,808 | A * | 4/1979 | Liepa et al. | 426/477 |
| 4,214,011 | A | 7/1980 | Strube | |
| 4,552,767 | A | 11/1985 | Saleeb et al. | |
| 5,033,254 | A * | 7/1991 | Zenger | B65B 31/006 53/431 |
| 5,251,424 | A * | 10/1993 | Zenger | B67C 3/045 53/431 |
| 5,322,701 | A | 6/1994 | Cullen et al. | |
| 5,692,381 | A | 12/1997 | Garrett | |
| 6,109,057 | A * | 8/2000 | Shervington et al. | 62/371 |
| 6,131,368 | A | 10/2000 | Tramposch et al. | |
| 6,143,058 | A | 11/2000 | Dahlgren et al. | |
| 6,299,007 | B1 * | 10/2001 | Takeuchi | B65D 1/0276 215/371 |
| 6,451,423 | B1 | 9/2002 | Armat et al. | |
| 6,511,726 | B1 | 1/2003 | Kinigakis | |
| 6,708,844 | B2 * | 3/2004 | Lim | B65D 51/24 222/3 |
| 7,159,374 | B2 * | 1/2007 | Abercrombie, III | B65D 81/2046 206/219 |
| 7,185,786 | B2 | 3/2007 | Krause et al. | |
| 7,235,274 | B2 | 6/2007 | Archibald et al. | |
| 7,637,082 | B2 * | 12/2009 | Abercrombie, III | B65D 81/2046 206/219 |
| 7,838,056 | B2 * | 11/2010 | Forgac et al. | 426/474 |
| 8,017,205 | B2 | 9/2011 | Shi | |
| 8,066,156 | B2 | 11/2011 | Schiff et al. | |
| 8,178,141 | B2 | 5/2012 | Ekanayake et al. | |
| 8,365,946 | B2 * | 2/2013 | Abercrombie | B65D 51/2807 206/217 |
| 2005/0184025 | A1 | 8/2005 | Hurley et al. | |
| 2005/0217211 | A1 * | 10/2005 | Py | 53/426 |
| 2005/0230415 | A1 | 10/2005 | Forgac et al. | |
| 2006/0026900 | A1 * | 2/2006 | Jang | C01B 3/0005 48/190 |
| 2006/0049215 | A1 | 3/2006 | Lim et al. | |
| 2008/0251491 | A1 * | 10/2008 | Krautkramer | B65D 41/34 215/341 |
| 2009/0120038 | A1 | 5/2009 | Abercrombie, III et al. | |
| 2009/0255929 | A1 | 10/2009 | Abercrombie, III et al. | |
| 2010/0000064 | A1 | 1/2010 | Garrett | |
| 2010/0127008 | A1 | 5/2010 | Abercrombie et al. | |
| 2010/0187137 | A1 * | 7/2010 | Kitahara | B01J 20/26 206/205 |
| 2011/0089058 | A1 | 4/2011 | Abercrombie, III et al. | |
| 2011/0265662 | A1 | 11/2011 | Forgac et al. | |
| 2011/0318460 | A1 | 12/2011 | Jensen et al. | |
| 2012/0043352 | A1 | 2/2012 | Rasmussen et al. | |
| 2012/0058230 | A1 | 3/2012 | Rasmussen et al. | |
| 2014/0231426 | A1 * | 8/2014 | Ichikawa | B29B 11/08 220/62.11 |

OTHER PUBLICATIONS

Examination Report No. 1 for AU Appl. No. 2013324129, dated Feb. 4, 2016, IP Australia, Canberra, Australia, 3 pages.

Requisition by the Examiner for CA Appl. No. 2,883,681, dated Mar. 7, 2016, Canadian Intellectual Property Office, Quebec, Canada, 4 pages.

Notification of the First Office Action for CN Appl. No. 201380050521.1, dated Mar. 17, 2016, The State Intellectual Property Office of the People's Republic of China, Beijing, China, 9 pages.

English translation of Notification of the First Office Action for CN Appl. No. 201380050521.1, dated Mar. 17, 2016, The State Intellectual Property Office of the People's Republic of China, Beijing, China, 12 pages.

International Preliminary Report on Patentability for International Application No. PCT/US2013/058377, The International Bureau of WIPO, Geneva, Switzerland, issued on Mar. 31, 2015, 6 pages.

Official Action for RU Appl. No. 2015115892/12(024782), dated Jul. 15, 2016, Rospatent, Federal Institute Of Industrial Property, Moscow, Russian Federation, 6 pages.

English translation of Official Action for RU Appl. No. 2015115892/12(024782), dated Jul. 15, 2016, Rospatent, Federal Institute Of Industrial Property, Moscow, Russian Federation, 3 pages.

Notice of Allowance for CN Appl. No. ZL201380050521.1, dated Jul. 29, 2016, The State Intellectual Property Office of the People's Republic of China, Beijing, China, 2 pages.

* cited by examiner

USE OF ADSORBER MATERIAL TO RELIEVE VACUUM IN SEALED CONTAINER CAUSED BY COOLING OF HEATED CONTENTS

BACKGROUND

In many applications, it is desirable to fill a container with a heated material and to then seal the container while the material is still in a heated state so as to sterilize the product and package and make the product safe for consumption. For example, various types of beverages are packaged in "hot-fill" containers fabricated from polyethylene terephthalate (PET). Typically, such containers are filled and capped at temperatures around 185° F. A container can deform when exposed to a liquid that has been heated above the glass transition temperature (Tg) of the material from which the container is formed. Moreover, steam and/or other heated gas in a sealed container headspace will condense as the container contents cool. Headspace condensation produces a vacuum in sealed hot-filled containers.

Most hot-fill beverage containers are designed to operate at or near atmospheric pressure. If such a container has a significant internal vacuum after it is sealed, it will deform and may buckle upon cooling. To avoid such distortion, any internal pressure that is significantly lower than external atmospheric pressure should be minimized and/or the container provided with appropriate structural support. Various techniques have been developed in this regard. For example, some PET container designs include movable vacuum panels or movable bases. Some hot-fill beverage containers have a thicker wall construction. These features result in heavier PET containers and increased material cost, however. Other techniques also have various drawbacks. Accordingly, there remains a need for additional techniques and devices that can reduce and/or relieve vacuum generated by hot-filling of deformable containers.

SUMMARY

This Summary is provided to introduce a selection of concepts in a simplified form that are further described below in the Detailed Description. This Summary is not intended to identify key or essential features of the invention.

In at least some embodiments, an adsorber material element is used relieve a vacuum that results from cooling of heated contents in a sealed container. An interior volume of that container may be filled or partially filled with a heated material. The heated material may be or may include a liquid. In some embodiments, the heated material may be a beverage or other food product intended for consumption by a human or animal. The container may be formed from any of a variety of materials and may have any of a variety of shapes. In some embodiments, the container may be formed from polyethylene terephthalate (PET) or other deformable material. The container may be at least partially filled with liquid above 150° F. and sealed. After sealing, one or more gases may be released from an adsorber material and into the interior volume of the sealed container. As the contents of the container cool, the release of gas(es) from the adsorber material relieves vacuum that would otherwise develop. In at least some embodiments, the gas release is initially gradual, with full release of gas occurring after the contents of the container have cooled below the Tg of the container material.

In some embodiments, an adsorber material insert may be incorporated into a container closure. Multiple closures may be stored in a pre-charging chamber to pre-charge the closure inserts with one or more gases. As containers are filled with heated beverage, closures may be dispensed from the pre-charging chamber and used to seal filled containers.

Additional embodiments are described herein.

BRIEF DESCRIPTION OF THE DRAWINGS

Some embodiments are illustrated by way of example, and not by way of limitation, in the figures of the accompanying drawings and in which like reference numerals refer to similar elements.

DETAILED DESCRIPTION

In at least some embodiments, an adsorber material element is used relieve a vacuum that results from cooling of heated contents in a sealed container. As used herein, a "vacuum" refers to a pressure within an internal volume of a sealed container that is less than a pressure in an external space that surrounds the sealed container. As also used herein, "relieving" a vacuum includes reducing a vacuum, i.e., reducing the difference between a pressure within a sealed container internal volume and a pressure in the external space that surrounds the container. "Relieving" a vacuum may also include completely eliminating a vacuum, i.e., causing the container internal volume pressure to be equal to or greater than an external space pressure. "Relieving" a vacuum may also encompass avoiding creation of a vacuum, e.g., releasing gas from an adsorber material at a rate that is sufficiently fast to prevent an container internal volume pressure from becoming less than an external space pressure as the container contents cool.

In some embodiments, an adsorber material element may be in the form of an insert. That insert, which may include one or multiple types of adsorber materials, may be housed in a closure used to seal the container. Prior to placement of an insert-housing closure onto a container filled with heated material and sealing the container, the adsorber material(s) may be pre-charged (also known as pre-loaded) with one or more gases. Those gases can include, without limitation, nitrogen ($N_2$), methane ($CH_4$), ethane ($C_2H_4$), carbon dioxide ($CO_2$), and/or other gases. When the container is filled and ready for capping, the closure (which includes the pre-charged adsorber material(s)) is placed onto the container and the container is sealed. Gas is released from the adsorber material(s) housed in the insert. The release of gas from the adsorber material(s) as the container contents cool relieves the vacuum associated with cooling of those contents and condensing of vapor and/or gases in the container headspace. Additional aspects of methods and devices according to these and other embodiments are described below.

Figure 1A:
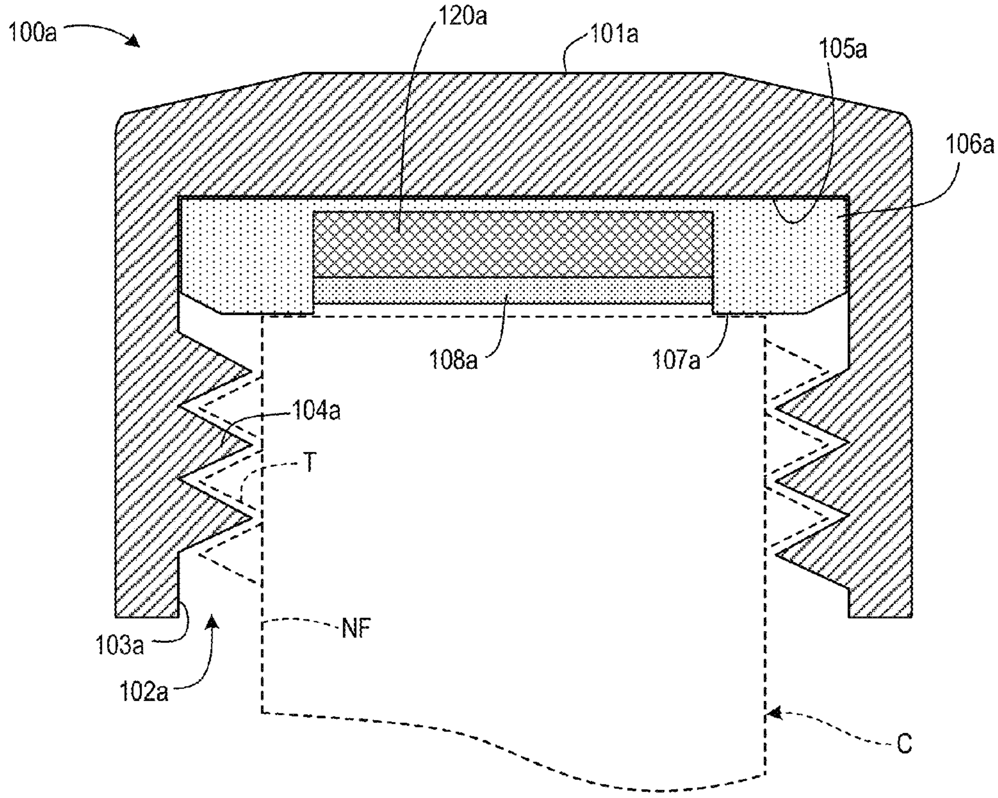
FIG. 1A is a partially schematic area cross-sectional view of a container closure, according to some embodiments, that includes an adsorbent material insert.

FIG. 1A is a partially schematic area cross-sectional view of a container closure 100*a*, according to some embodiments, that includes an adsorbent material insert. Closure 100*a* includes a housing 101*a*. The outer shape of housing 101*a* is generally cylindrical. The sectioning plane of FIG. 1A passes through the vertical centerline of closure 100*a*.

Closure 100*a* is configured for attachment to a threaded neck finish of a polyethylene terephthalate (PET) beverage container in a conventional manner. In particular, a cavity 102*a* in the underside of housing 101*a* is configured to receive a finish portion of a container neck. For reference purposes, FIG. 1A shows a neck finish NF of a container C in broken lines. An interior sidewall 103*a* of cavity 102*a* includes helical threads 104*a* formed thereon. When closure 100*a* is placed onto a container neck finish and turned, threads 104*a* engage with corresponding threads (T) on the neck finish to secure closure 100*a* to the container. Housing 101*a* can be molded from any of various thermoplastic or other materials conventionally used for container closures.

The upper end of cavity 102*a* terminates in a liner well 105*a*. Closure 100*a* further includes a disc-shaped liner 106*a* positioned in liner well 105*a*. Similar to liners of conventional beverage container closures, liner 106*a* acts to seal a container when closure 100*a* is secured to a container neck finish. Specifically, bottom surface 107*a* of liner 106*a* is pressed against a sealing surface on the top edge of a neck finish when closure 100*a* is tightened onto that neck finish.

Unlike conventional liners, however, liner 106*a* holds an adsorber material insert 120*a*. Insert 120*a* contains one or more adsorber materials that have been selected based on an ability to adsorb a desired gas under one set of conditions and to then release the adsorbed gas under a different set of conditions. For example, the adsorber material(s) may adsorb the selected gas(es) under conditions that comprise a relatively high concentration of the selected gas(es) at a relatively high pressure. The adsorber material(s) may release the adsorbed gas(es) under conditions that comprise a lower pressure and/or the presence of added moisture.

Gases that may be adsorbed and then released into a container according to various embodiments include, without limitation, one or more of the following: nitrogen ($N_2$), methane ($CH_4$), ethane ($C_2H_6$) and carbon dioxide ($CO_2$). Gases that are minimally soluble in liquid (or other container contents) may be preferred in at least some embodiments. In some embodiments, an adsorber material insert or other type of adsorber material element may only be pre-charged with a single type of gas. When that adsorber material element is later exposed to the sealed container interior, that single type of gas is released. In other embodiments, an adsorber material element or collection of adsorber material elements may be pre-charged with multiple types of gases. When that adsorber material element or element collection is later exposed to the sealed container interior, each of those multiple types of gas may be released. In at least some embodiments, multiple gas adsorber material elements may be utilized to control the rate and release characteristics of adsorbed gas(es) as a function of time.

Numerous types of adsorber materials are known in the art, including, without limitation, zeolites, carbon, carbon nanotubes and metal organic frameworks (MOFs). One example of an MOF that may be used in some embodiments and that can be used to adsorb $CO_2$, $CH_4$ and/or $N_2$ is available under the trade name BASOLITE C300 from Sigma-Aldrich Co. LLC of St. Louis, Mo., US. Other adsorbers that can be used include, without limitation, 13X zeolite, activated carbon and 5A zeolite. These materials, which can also be used to adsorb $CO_2$, $CH_4$ and/or $N_2$, are well-known and commercially available from numerous sources.

In some embodiments, an adsorber material insert or other adsorber material element may only include a single type of adsorber material. For example, an insert may be configured to adsorb a single gas, e.g., gas A. Adsorber material X adsorbs gas A, and thus an adsorber material insert configured to adsorb (and subsequently release) gas A might only include adsorber material X. In other embodiments, an adsorber material element may be comprised of multiple different types of adsorber materials. As another example, an adsorber material insert may be configured to adsorb two different types of gas, e.g., gas B and gas C. Adsorber material Y may be a good adsorber of gas B but a poor adsorber of gas C. Similarly, adsorber material Z may be a good adsorber of gas C but a poor adsorber of gas B. Thus, an adsorber insert configured to adsorb (and subsequently release) gases B and C could contain a mixture of adsorber materials Y and Z. Alternatively, multiple adsorber inserts containing different types of adsorbers could be used to release one or more gases.

In some embodiments, insert 120*a* is formed as a solid disc before being embedded into liner 106*a*. In addition to one or more adsorber materials, insert 120*a* may include one or more binder materials (e.g., clay, fibers, polymers, waxes, cements) so as to maintain the integrity of insert 120*a* as a solid disc. In some embodiments, insert 120*a* is solid, but may have a different shape so as to maximize exposed surface area. For example, instead of a solid disc, insert 120*a* could be in the form of a solid spur with multiple spokes. In still other embodiments, the adsorber material(s) of insert 120*a* may be in granular form. For example, insert 120*a* could be in the form of a pouch formed by an outer membrane holding particles of adsorber material(s). Examples of such an embodiment are described below in connection with FIG. 1C.

Liner 106*a* includes a semipermeable region 108*a* located directly under insert 120*a*. Semipermeable region 108*a* allows gas escaping from insert 120*a* to pass through liner 106*a* and reach an interior volume of a container sealed by closure 100*a*. Region 108*a* also allows some moisture from that interior volume to reach insert 120*a*. As explained in further detail below, such moisture may in some embodiments trigger the release of gas from insert 120*a*. In the embodiment of closure 100*a*, liner 106*a* is formed from two types of material. The first type of material is used for semipermeable region 108*a* and the second type is used for the remainder of liner 106*a*. The second type of material is not permeable to gas or moisture. Examples of materials that can be used for the non-permeable portions of liner 106*a* include, without limitation, aluminum foil laminated elements. Examples of materials from which semipermeable region 108*a* can be formed include, without limitation, thermoplastic elastomers (TPEs), styrene ethylene butylene styrene (SEBS) terpolymer and ethylene vinyl acetate (EVA).

Figure 1B:
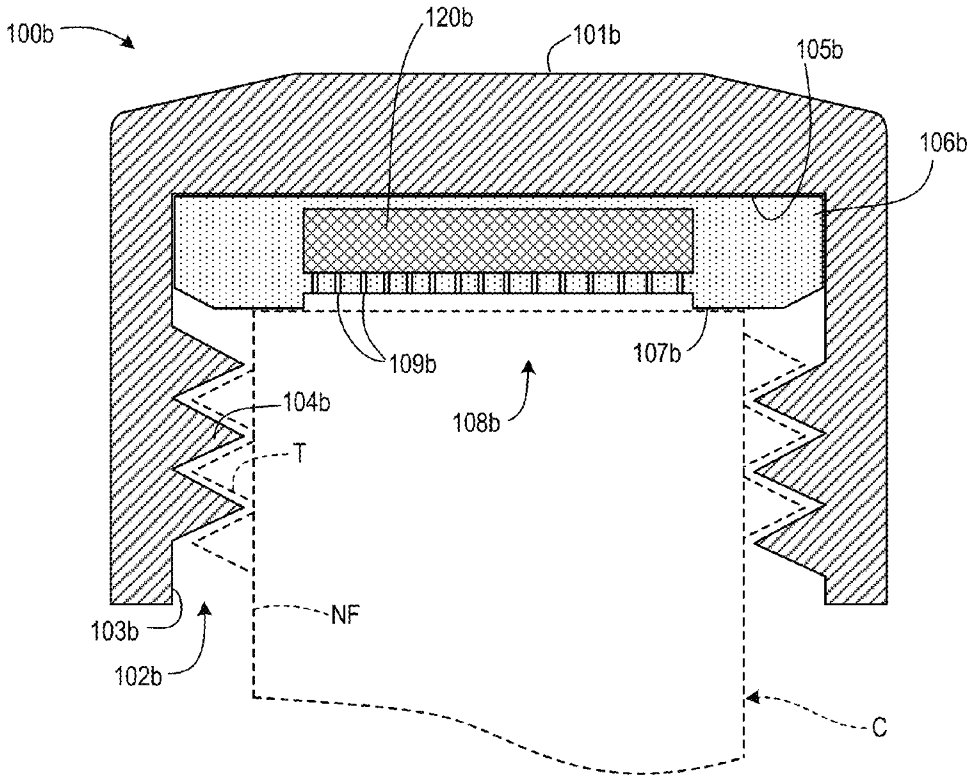
FIG. 1B is a partially schematic area cross-sectional view of a container closure according to some additional embodiments.

FIG. 1B is a partially schematic cross-sectional view of a container closure 100*b* according to some additional embodiments. Except as described below, closure 100*b* is similar to enclosure 100*a*. Unless indicated otherwise, an element in FIG. 1B having a reference number ending with a "b" is similar to and operates in the same manner as the element of FIG. 1A having a like reference number ending with an "a." For example, housing 101*b* in FIG. 1B is similar to and operates in the same manner as housing 101*a* of FIG. 1A.

Closure 100*b* differs from closure 100*a* because of liner 106*b*. Unlike liner 106*a*, where semipermeable region 108*a* is formed from a different material than other portions of liner 106*a*, semipermeable region 108*b* of liner 106*b* is formed from the same non-permeable material used to form other portions of liner 106*b*. So that region 108*b* will allow gas released from insert 120*b* to reach a container interior volume and allow moisture from the container interior to reach insert 120*b*, a plurality of small pores 109*b* are formed in region 108*b*.

Figure 1C:
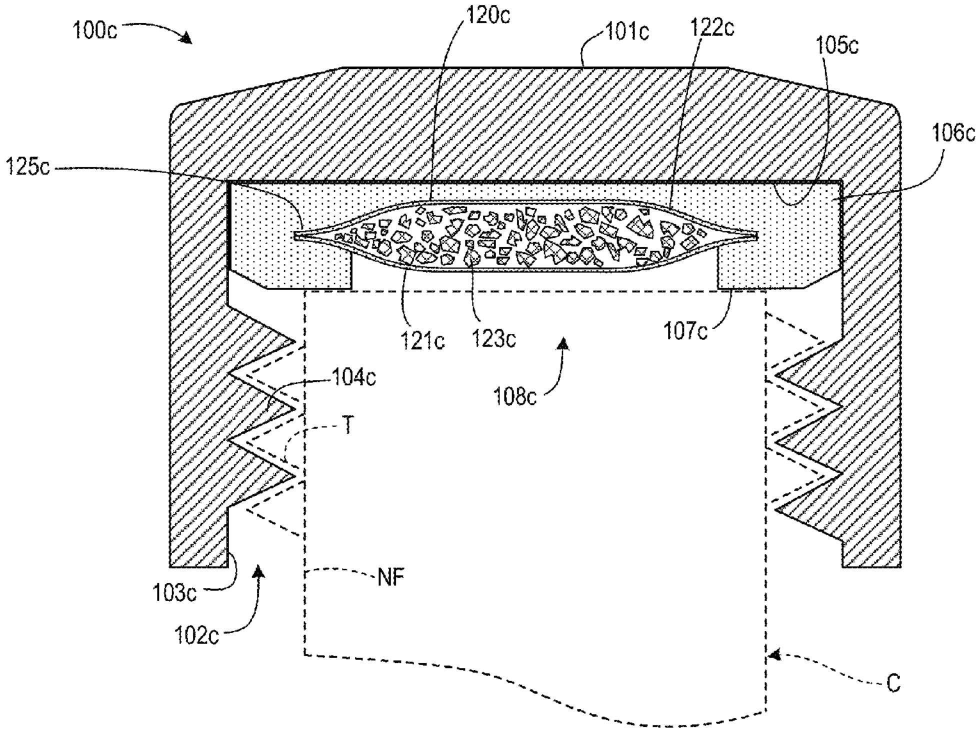
FIG. 1C is a partially schematic area cross-sectional view of a container closure according to some further embodiments.

FIG. 1C is a partially schematic area cross-sectional view of a container closure 100*c* according to some further embodiments. Except as described below, closure 100*c* is similar to enclosure 100*a*. Unless indicated otherwise, an element in FIG. 1C having a reference number ending with a "c" is similar to and operates in the same manner as the element of FIG. 1A having a like reference number ending with an "a." For example, housing 101*c* in FIG. 1C is similar to and operates in the same manner as housing 101*a* of FIG. 1A.

Closure 100*c* includes an adsorber insert 120*c* that differs from the solid inserts 120*a* and 120*b* of FIGS. 1A and 1B. Insert 120*c* comprises multiple particles 123*c* of one or more types of adsorber materials. Unlike the solid inserts in FIGS. 1A and 1B, particles 123*c* are not bound together to form a solid monolithic adsorber material element. Instead, particles 123*c* are held together in a pouch between two sheets 121*c* and 122*c* of membrane material. Each of sheets 121*c* and 122*c* may be generally circular in shape. Particles 123*c* may be placed between sheets 121*c* and 122*c*. Sheets 121*c* and 122*c* can then be joined around their peripheral edges 125*c* to form a flattened, circular pouch that secures particles 123*c* within a perimeter formed by a seal around peripheral edges 125*c*. At least membrane 121*c* may formed from a semipermeable material such as SEBS.

Semipermeable region 108*a* of closure 100*a* liner 106*a* may also act to moderate the rate at which gas diffuses from insert 120*a* to a container interior. In a similar fashion, region 108*b* of liner 106*b* (closure 100*b*) and membrane 121*c* (element 120*c* within liner 106*c* of closure 100*c*) may also act to moderate the rate at which gas diffuses from an adsorber insert to a container interior.

Closures 100*a*-100*c* can be fabricated in a variety of ways. For example, insert 120*a*-120*c* could first be formed. In some embodiments, and depending on the adsorber material(s) selected, insert 120*a* or 120*b* might be formed by molding the selected adsorber material(s) in a matrix of one or more binder materials to form a solid disc. As indicated above, insert 120*c* could be formed by sealing the selected adsorber material(s) between sheets of membrane material. The non-permeable portion of liner 106*a* may molded into place around insert 120*a*, after which semipermeable region 108*a* could be molded into place. After molding of liner 106*a* is complete, liner 106*a* could be placed into well 105*a* of housing 101*a*. Housing 101*a* could be injection molded in a conventional manner. In other embodiments, a previously formed insert 120*a* could be placed in a well of housing 101*a* and liner 106*a* could be molded in place around insert 120*a*. Similar operations could be used to fabricate closures 100*b* or 100*c*, with modifications to accommodate differences in the various embodiments. For example, pores 109*b* in closure 100*b* could be formed during the process of molding liner 106*b* by using small pins or other mold elements.

FIGS. 2A through 2E are partially schematic drawings illustrating steps in a method according to some embodiments utilizing closures such as those of FIGS. 1A through 1C. Because the method described in connection with FIGS. 2A-2E could be performed using any of closures 100*a*-100*c*, or using closures according to other embodiments, the closure in FIGS. 2A-2E will simply be referenced as closure 100.

Figure 2A:
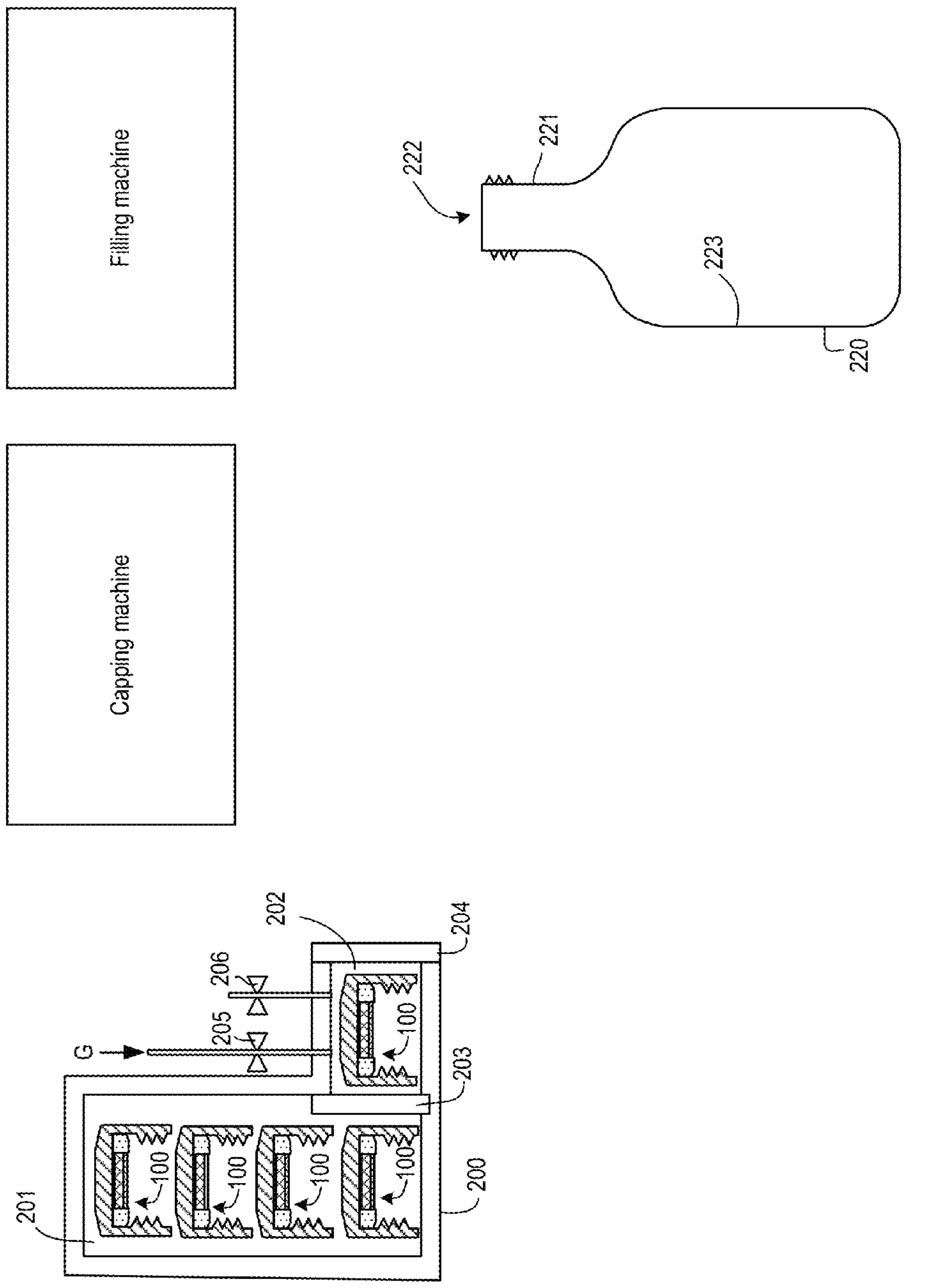
FIGS. 2A through 2E are partially schematic drawings showing steps in a method, according to some embodiments, utilizing a closure such as shown in FIGS. 1A-1C.

FIG. 2A shows a pre-charging chamber 200 that holds a supply of closures 100. Chamber 200 is positioned near a capping machine that will receive closure 100 from chamber 200 and use that received closure 100 to seal a container, as described in further detail below. Chamber 200 includes a main chamber 201 and a dispensing chamber 202. Main chamber 201 maintains an atmosphere of gas G at a pressure of up to 6 bars. The supply of closures 100 remain in main chamber 201 to pre-charge each their adsorber inserts 120 with gas G. Gas G could be $N_2$, $CH_4$, $C_2H_6$, $CO_2$ and/or other gas or combination of multiple gases. Dispensing chamber 202 acts to prevent depressurization of main chamber 201 when a closure 100 is removed from chamber 200 and used to seal a container. Dispensing chamber 202 includes an inner door 203, and outer door 204, a gas G supply line controlled by a valve 205 and a vent line controlled by a valve 206.

To dispense a closure from pre-charging chamber 200 for use in sealing a container, outer door 204, inner door 203 and vent valve 206 are closed. Gas G valve 205 is opened and dispensing chamber 202 is pressurized to 6 bars (or to the same pressure as main chamber 201, if different), and then valve 205 is closed. Inner door 203 is then opened, a closure 100 is moved from main chamber 201 to dispensing chamber 202, and inner door 203 is closed. Vent valve 206 is then opened to release the excess pressure within dispensing chamber 202, after which outer door 204 is opened and closure 100 is moved from dispensing chamber 202 to the capping machine. For convenience, FIG. 2A shows a closure 100 already positioned in dispensing chamber 202. FIG. 2A further assumes that dispensing chamber 202 is pressurized, gas G valve 205 is closed and vent valve 206 is closed.

FIG. 2A further shows a container 220 that will ultimately be capped and sealed by one of the pre-charged closures 100 in chamber 200. Container 220 is located near a filling machine, but has not yet been filled. Container 220 includes a neck finish 221 similar to the neck finish NF of FIGS. 1A-1C and onto which a closure 100 will be attached. Neck finish 221 surrounds an opening 222 that exposes an interior volume 223 of container 220.

Figure 2B:
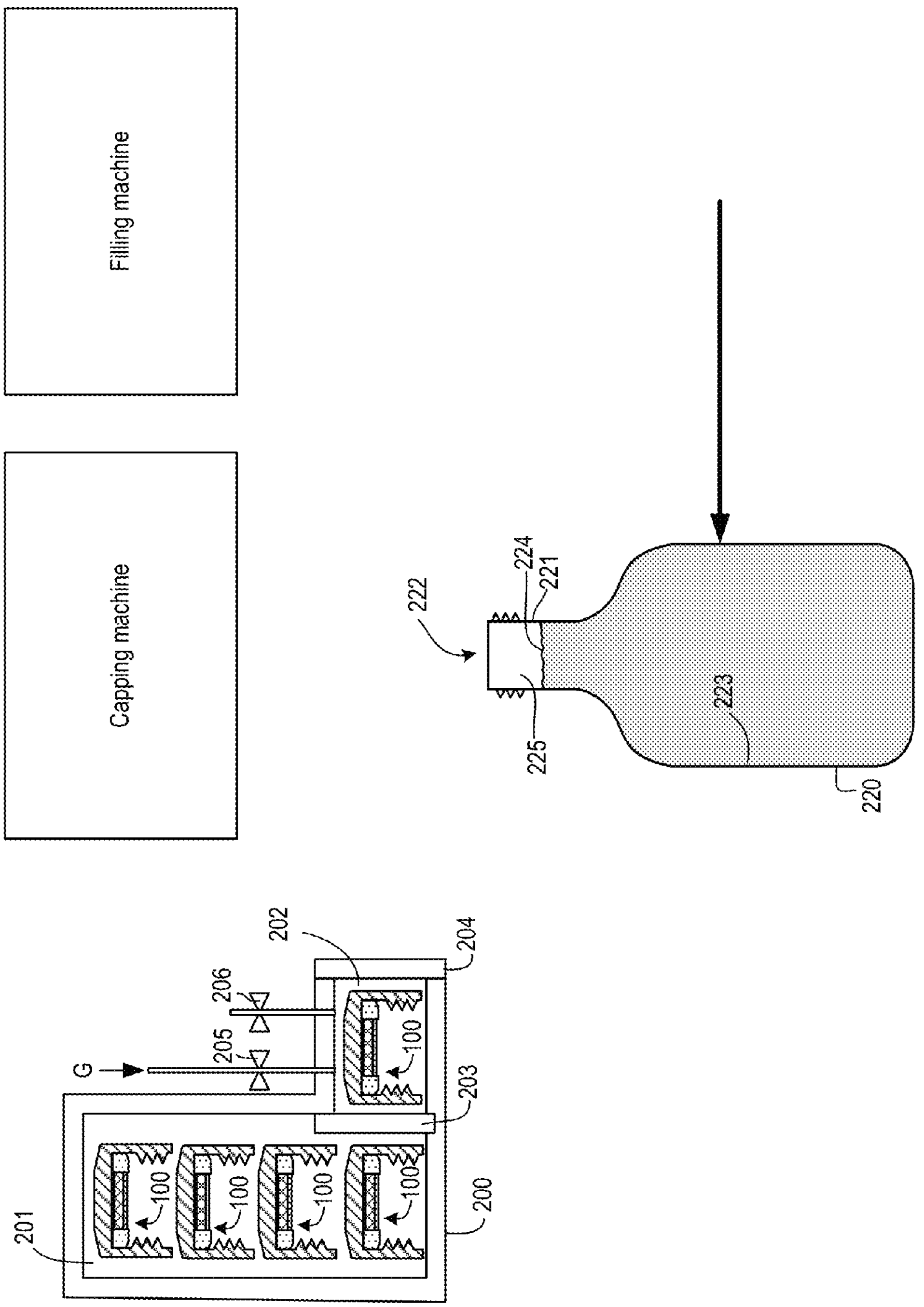

FIG. 2B shows container 220 immediately after it has been filled with a heated liquid 224. In particular, the filling machine has dispensed a quantity of heated liquid 224 into interior volume 223 through opening 222. Filled container 220 was then moved to the capping machine immediately after filling and while liquid 222 is still hot.

Figure 2C:
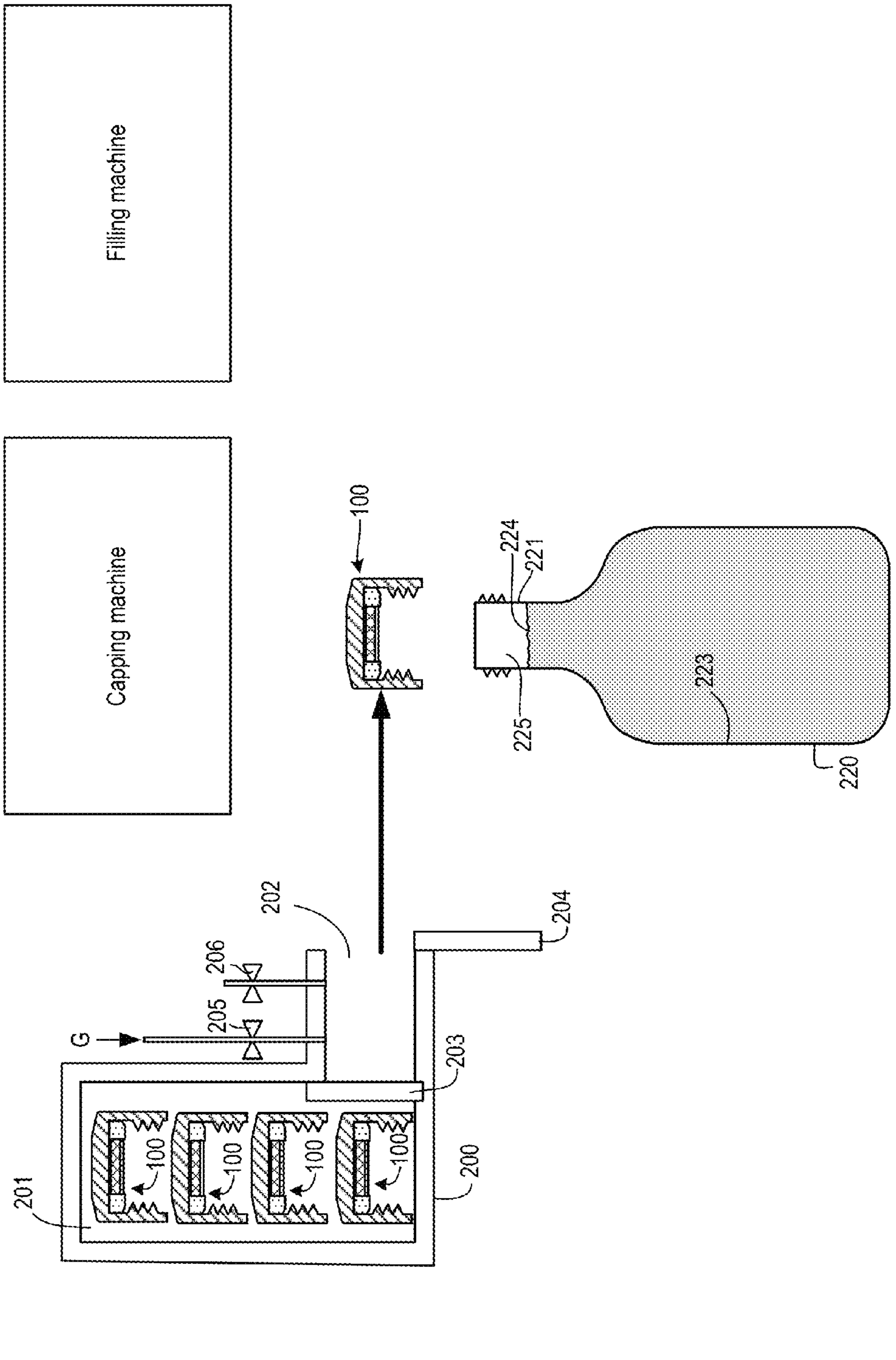

FIG. 2C shows the start of the capping step. In some embodiments, a container is sealed within one second of being hot-filled. A pre-charged closure 100 is dispensed from chamber 200. In particular, vent valve 206 opens, outer door 204 opens, and a closure 100 is dispensed from dispensing chamber 202 to the capping machine. After dispensing a closure 100 to the capping machine, outer door 204 and vent valve 206 close and dispensing chamber 202 may begin loading another pre-charged closure for use in sealing another container.

Figure 2D:
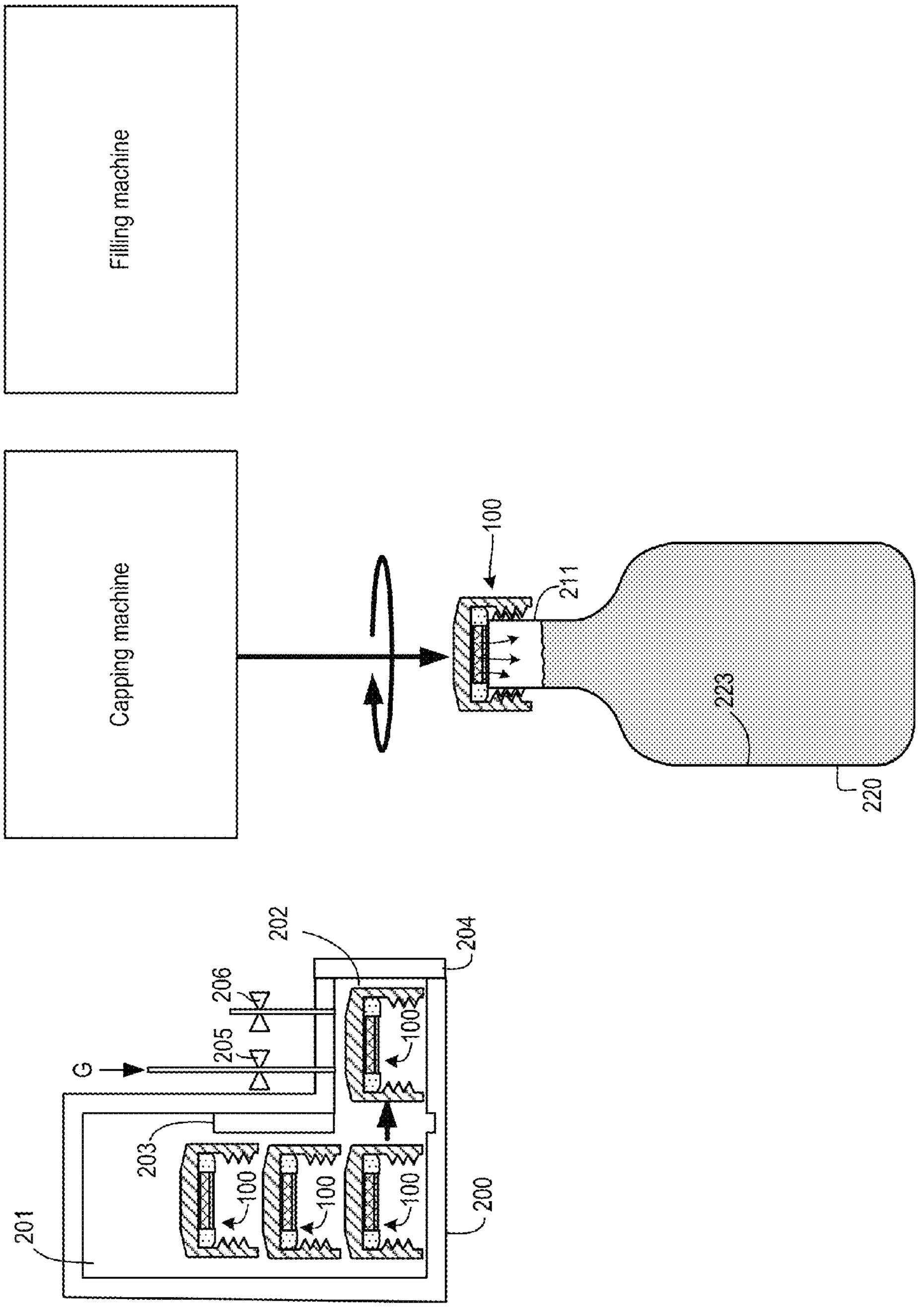

Immediately upon being exposed to atmospheric pressure, the pre-charged adsorber material insert within the dispensed closure 100 begins to release gas G. Accordingly, and as shown in FIG. 2D, the capping machine quickly secures the closure 100 to neck finish 211 of container 220 and seals container 220. Once container 220 is sealed, any gas G released from insert of the closure 100 will be released to interior volume 223 of container 220.

This is shown schematically in FIG. 2D. Specifically, the small arrows moving downward from closure 100 indicate that release of gas G has begun. Although not shown in FIG. 2D, the contents of container 220 (liquid 224 and vapor in headspace 225) have started to cool. Gas G released from insert 120 thus helps to relieve vacuum pressure that would otherwise form within interior volume 220 as liquid 224 cools.

As further shown in FIG. 2D, operations associated with loading of another closure 100 into dispensing chamber 202 also continue. Valve 205 has already been opened to pressurize chamber 205 with gas G and then closed. Inner door 203 has now been opened and a closure 100 has been moved from chamber 201 to chamber 202. Inner door 203 will subsequently close and chamber 202 will then be ready to dispense the newly loaded closure 100 for use in sealing the next filled container. Although not shown, that next container could be in position for filling at the filling machine as container 220 is being capped in FIG. 2D.

Figure 2E:
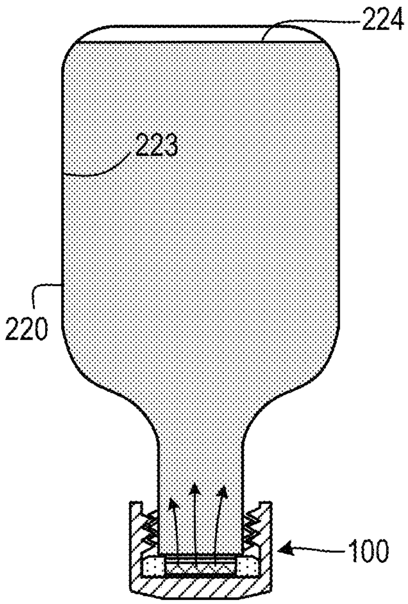

FIG. 2E shows a step in which sealed container 220 is inverted. This step brings heated liquid 224 into contact with closure 120 so as to sanitize closure 100. The step also causes moisture from liquid 224 to permeate to the adsorber material insert of the closure 100. As indicated above in connection with FIGS. 1A-1C, this moisture could permeate through region 108*a* in the embodiment of FIG. 1A, through region 108*b* in the embodiment of FIG. 1B, or through membrane 121*c* in the embodiment of FIG. 1C. This moisture acts to trigger a more rapid release of gas from the insert, as indicated schematically by the larger arrows shown in FIG. 2E.

Sealed container 220 may then be passed through a cooling tunnel (not shown). As container 220 passes through the cooling tunnel, it may be sprayed with water so as to lower the temperature of liquid 224 to approximately 165° F. As the temperature of liquid 224 drops, gas G continues to be released from insert. This release of gas G continues to relieve vacuum within interior region 220.

Figure 3:
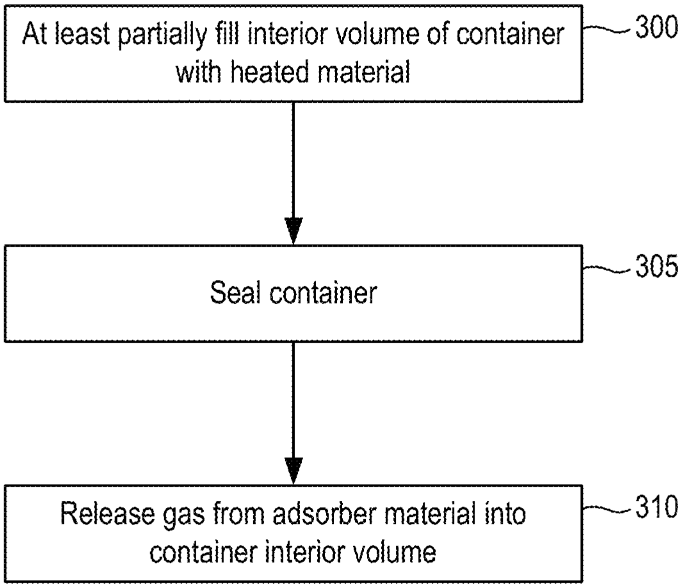
FIG. 3 is a block diagram showing steps of methods, according to at least some embodiments, for relieving vacuum in sealed containers caused by cooling of container contents.

FIG. 3 is a block diagram show steps of methods, according to at least some embodiments, for relieving vacuum in sealed containers caused by cooling of heated container contents. Embodiments of the methods shown in FIG. 3 include the embodiments described above, as well as additional embodiments as set forth below.

Step 300 includes at least partially filling an interior volume of a container with a heated material. In some embodiments the container is filled, but in other embodiments the container may not be completely filled. The container can have any of various shapes. In some embodiments, and as is shown in FIGS. 2A-2E, the container may be in the shape of a bottle having a neck portion. The neck portion may have an opening exposing an interior volume of the bottle. The neck portion may also include a finish that includes threads or other elements to secure a closure to seal the opening. Containers can have other shapes and configurations in other embodiments. Such shapes can include, without limitation, jars, cartons, canisters, etc.

The container can also be formed of various materials. In at least some embodiments, the container is formed from a deformable material such as PET. In other embodiments, the container is formed from one or more other types of plastic materials. Such other plastic materials can include, without limitation, polyethylene naphthalate or other resins with a Tg of greater than 75° C. In still other embodiments, the container may be formed from one or more other plastic or non-plastic deformable materials. In yet other embodiments, the container may include one or more non-deformable portions. As used herein, an element is "non-deformable" if it does not show any noticeable deformation to the naked eye when a container incorporating the element is subjected to an unrelieved vacuum pressure caused by content cooling.

In some embodiments, the heated material placed into the container during step 300 is, or includes, a liquid. In at least some embodiments, the heated material is a beverage or other food product intended for consumption by a human or animal. The beverage or other food product may have any of numerous formulations, consistencies and/or textures. The beverage or other food product may be viscous, thin or watery, may or may not have inclusions (e.g., fruit pulp), etc. In some embodiments, the beverage or other food product may be gelatinous or a slurry. Examples of heated liquids with which a container may be at least partially filled in step 300 include, without limitation, fruit juices, sports drinks and other beverages, as well as dairy products. The heated material placed into the container in step 300 may be a mixture of other materials.

The temperature to which the material is heated at the time of filling in step 300 may also vary by embodiment. That temperature may depend, at least in part, on the material being placed into the container. As used herein, "heated" means significantly above room temperature. In at least some embodiments, a material is heated to at least 150° F. during the at least partial filling of step 300. In other embodiments, the material is heated to at least 160° F., to at least 165° F., to at least 170° F., to at least 175° F., to at least 180° F., to at least 185° F., or higher, during the at least partial filling of step 300.

Step 305 includes sealing the container after the filling (or partial filling) of the container with the heated material. In some embodiments, and as described in connection with FIGS. 2A-2E, the sealing may include applying a closure and tightening or otherwise engaging sealing components of the closure. In some embodiments, for example, a closure may lack threads and may utilize a clip or other type of engaging mechanism to secure the closure to the container.

A closure need not be used in all embodiments. In some embodiments, for example, the sealing operations of step 305 might include welding or otherwise permanently closing an opening on the container. For example, in some embodiments an adsorber insert similar to insert 120*a* might be wrapped in a semi-permeable material intended to withstand long-term immersion in the material within a sealed container. A supply of such inserts could be pre-charged in a chamber in a manner similar to the manner in which closures 100 are pre-charged in chamber 200 in the embodiment of FIGS. 2A-2E. After filling a plastic container with a heated material (e.g., a beverage), a pre-charged inserts could be dropped into the container through a container opening and the container opening welded shut.

Step 310 includes releasing a gas from an adsorber material element into an interior volume of the container after the container has been sealed. This adsorber material element is pre-charged with one or more gases such that those one or more gases are adsorbed into pores on the surface of the adsorber material(s). Prior to sealing the container in step 305, the adsorber material element is placed in a location so that gas(es) released from the adsorber material can flow into the container interior volume. In some embodiments, and as described in connection with FIGS. 1-2E, the adsorber material element is incorporated into the sealing liner of a closure. In other embodiments, an adsorber element could be located elsewhere. As indicated above, an adsorber material element could be formed as an insert that is dropped into a container prior to sealing. As another example, an adsorber material element could be incorporated into a container body. In such an embodiment, the container itself could be pre-charged with one or more gases in a manner similar to that in which closures 100 are pre-charged in the embodiment of FIGS. 2A-2E. However, a container in such an embodiment could be removed from a pre-charging chamber just prior to filling and then be immediately filled and sealed.

Once the container is sealed, exposure to conditions within the container interior volume (e.g., pressure drop, moisture) cause one or more gases to be released from adsorber material element. The released gas(es) flow into the container interior volume. As the heated material in the container cools, the ongoing release of gas(es) from the adsorber material element relieves vacuum caused by the cooling of the container contents.

Different gases and/or combinations of gases can be released during step 310 in various embodiments. As indicated above, those gases include, without limitation, nitrogen ($N_2$), methane ($CH_4$), ethane ($C_2H_4$) and carbon dioxide ($CO_2$). Other gases can include, without limitation, hydrogen ($H_2$) and helium (He). In some embodiments, gases with low aqueous solubility are selected so as to reduce the volume of gas that must be released so as to relieve vacuum. Numerous materials can be used as an adsorber material in an adsorber material element according to various embodiments. Those materials include, without limitation, the materials previously identified. An adsorber material element may also include other binders and other compounds to maintain the adsorber material(s) as a monolithic element. An adsorber material element may include adsorber materials in granular or other loose form that are contained by a membrane or other barrier. An adsorber material element may contain a single type of adsorber material (e.g., so as to adsorb and release a single gas) or may contain multiple types of adsorber materials (e.g., so as to adsorb and release multiple gases).

In at least some embodiments, it is desirable to avoid deforming a container when a product filling that container is at a temperature above the Tg of the container material. This helps to avoid permanently expanding the container material to create an even larger internal volume. As a result, container shape and integrity can be maintained.

So as to avoid permanently deforming the container when the contents are above the container material Tg, an adsorber, a matrix containing the adsorber and/or a semi-permeable liner region surrounding the adsorber can be selected to result in a timed release of adsorbed gas. In particular, the adsorber, matrix and/or liner region can be selected so that the container is not overpressurized while the container contents are above Tg for the container material. Instead, gas is released gradually so that most of the adsorbed gas is released after the container contents cool below the container material Tg. For example, the adsorber, matrix and/or liner region can be selected so that less than 50% of the adsorbed gas is released upon filling of the container with heated product, and so that the remainder is released after the product has cooled below the container material Tg. One non-limiting example of an adsorber and matrix meeting this criteria is described below.

In some additional embodiments of methods according to FIG. 3, an adsorber material element need not be pre-charged. In some such embodiments, gas(es) are added to the container in an additional step performed before, during or after the hot-filling of step 300, but prior to step 305. In particular, a dose of liquid nitrogen and/or other liquefied gas(es) can be added to the container just prior to sealing with a closure. The closure can be similar to closure 100, but the adsorber material element need not be precharged with gas. After sealing with the closure, the interior volume of the closure pressurizes as the dose of liquefied gas(es) evaporates. The elevated pressure within the container will cause the gas(es) to be adsorbed by the adsorber material element within the closure. The adsorption will prevent the container from becoming overpressurized while the contents are heated and the container is susceptible to plastic deformation. As the container contents cool and pressure within the sealed container drops, the adsorber material element releases the adsorbed gas(es) back into the container to reduce vacuum formation.

Figure 4A:
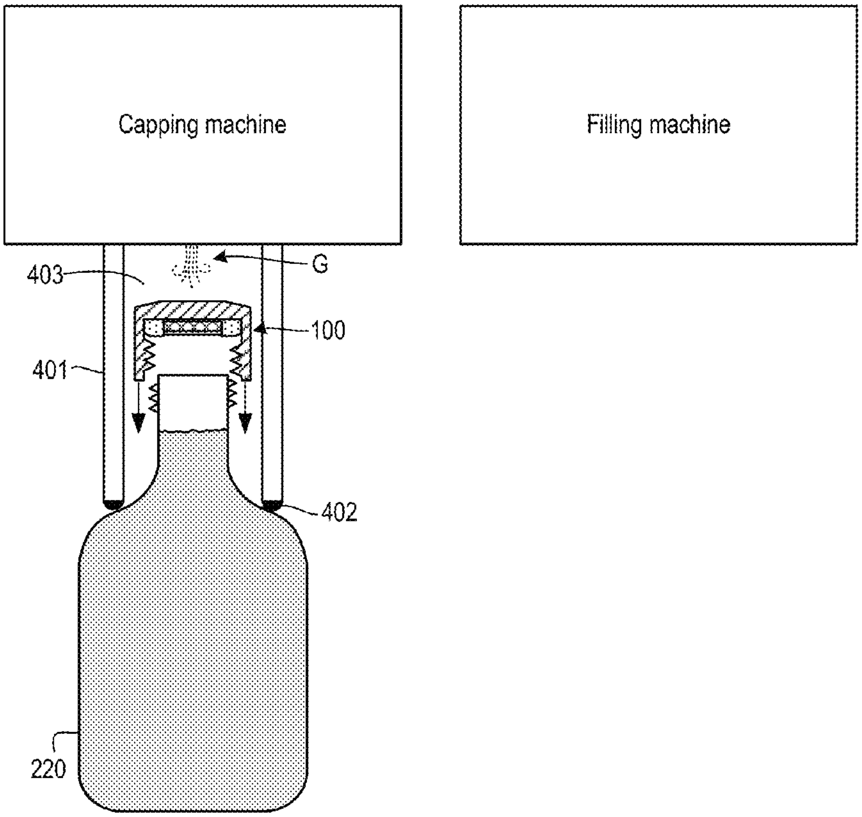
FIGS. 4A and 4B are partially schematic drawings showing use of a pressurized capping device during performance of a method according to some embodiments.
Figure 4B:
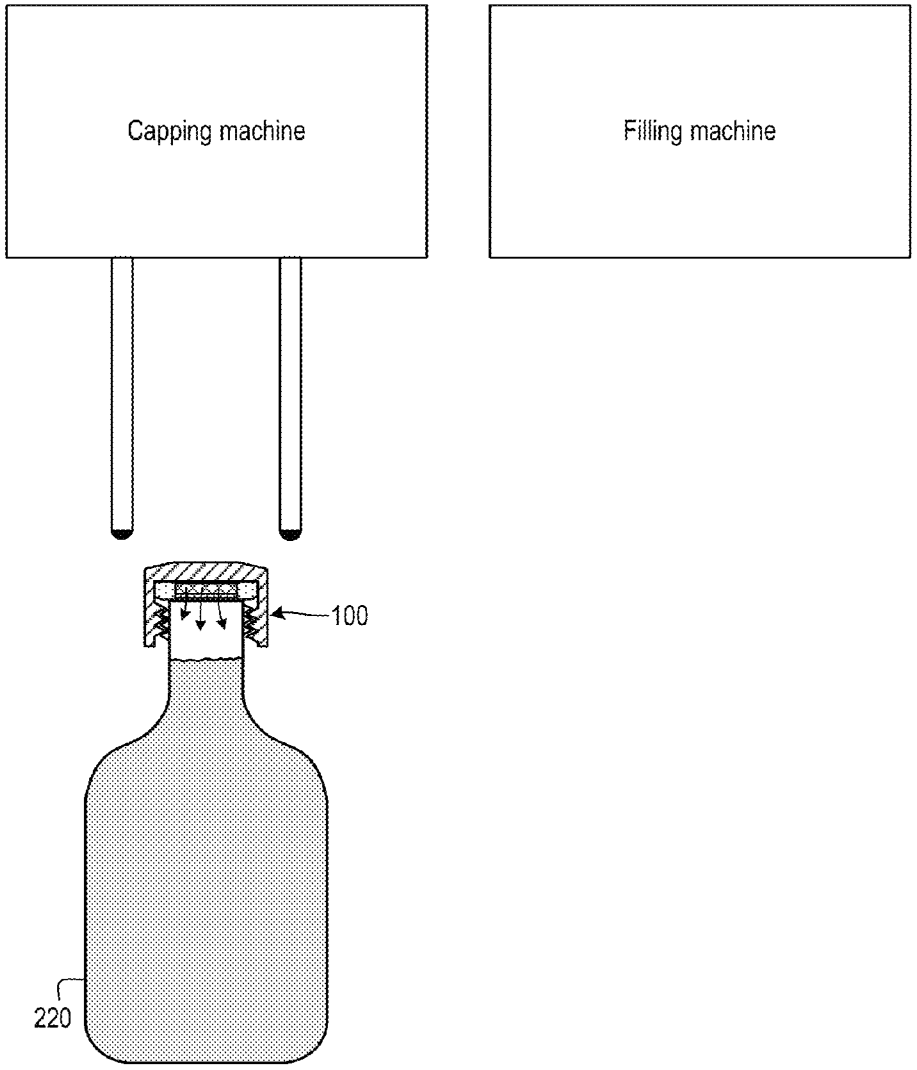

In further embodiments, gas(es) G can be added to the container using a pressurized capping device during step 305. FIGS. 4A and 4B are partially schematic drawings showing use of such a device. In some such further embodiments, a capping machine may include a collar 401 that encloses the neck of the container 220. A bottom edge 402 may include a gasket to form a seal against the container outer wall and create a pressure chamber 403. Once collar 401 is lowered over the neck of a hot-filled container 220 and a seal formed by edge 402, pressurized gas(es) G can be released into pressure chamber 403. A chuck or other component (not shown) can then lower a closure 100 and seal that closure to the neck finish of container 220. The pressurized gas(es) G within chamber 403 begins to adsorb into the adsorber material element of closure 100 as closure 100 is being placed onto the neck finish. For a short time after closure 100 is secured, the gas(es) G within the container 220 headspace will continue adsorbing into the adsorber material element of closure 100. As with the previously described embodiment, the adsorption may help prevent the container from becoming overpressurized while the contents are heated and the container is susceptible to plastic deformation. As the container contents cool and pressure within the sealed container drops, the adsorber material element releases the adsorbed gas(es) G back into the container to reduce vacuum formation (FIG. 4B).

EXAMPLE 1

An adsorber insert was formed by compounding approximately 2 grams of zeolite 13X in EVA so that the EVA was approximately 70% loaded with the zeolite. The insert was charged with $N_2$ at 10 bar for over a day. The insert was then placed in a closure used to cap a 20 ounce PET container that had been filled with hot water heated to 185° F. The container was allowed to cool in room temperature air. Internal pressure in the container increased from approximately −0.8 psig to approximately −0.7 psig in the first five hours after filling. The internal pressure progressively reached approximately −0.05 psig overnight. The container exhibited no appreciable buckling after 24 hours and was firm to grip.

CONCLUSION

The foregoing description of embodiments has been presented for purposes of illustration and description. The foregoing description is not intended to be exhaustive or to limit embodiments to the precise form explicitly described or mentioned herein. Modifications and variations are possible in light of the above teachings or may be acquired from practice of various embodiments. The embodiments discussed herein were chosen and described in order to explain the principles and the nature of various embodiments and their practical application to enable one skilled in the art to make and use these and other embodiments with various modifications as are suited to the particular use contemplated. Any and all permutations of features from above-described embodiments are the within the scope of the invention.

The invention claimed is:

1. A method comprising:

at least partially filling an interior volume of a container with a heated fill material;

sealing the container after the at least partial filling; and releasing a gas from at least one adsorber material into the container interior volume after the sealing comprising releasing a gas at a first rate when the fill material has a temperature above a glass transition temperature of a material from which the container is formed and at a second rate after the fill material has a temperature below the glass transition temperature, and wherein the second rate is greater than the first rate.

2. The method of claim 1, wherein at least partially filling an interior volume of a container comprises at least partially filling the interior volume of a deformable container.

3. The method of claim 1, wherein at least partially filling an interior volume of a container comprises at least partially filling the interior volume of a polyethylene terephthalate container.

4. The method of claim 1, wherein the gas is released from the at least one adsorber material while the heated fill material cools inside the sealed container.

5. The method of claim 4, wherein at least partially filling an interior volume of a container comprises at least partially filling the interior volume of a deformable container.

6. The method of claim 4, wherein at least partially filling an interior volume of a container comprises at least partially filling the interior volume of a polyethylene terephthalate container.

7. The method of claim 6, wherein at least partially filling an interior volume of a container comprises at least partially filling the interior volume of the polyethylene terephthalate container with a human-consumable beverage.

8. The method of claim 1, wherein at least partially filling an interior volume of a container comprises at least partially filling the interior volume of a container with a human consumable beverage heated to at least 150° F.

9. The method of claim 1, wherein sealing the container comprises applying a closure to an opening of the container, and the closure comprises the at least one adsorber material.

10. The method of claim 9, wherein at least partially filling an interior volume of a container comprises at least partially filling the interior volume of a container with a human-consumable beverage heated to at least 150° F.

11. The method of claim 10, wherein the gas is released from the at least one adsorber material while the heated fill material cools inside the sealed container.

12. The method of claim 1, further comprising releasing multiple gases from the at least one adsorber material into the container interior volume after the sealing.

13. The method of claim 1, wherein releasing a gas from the at least one adsorber material comprises releasing the gas from an adsorber material insert comprising multiple types of adsorber materials.

14. The method of claim 1, further comprising:

storing a plurality of closures in a chamber, wherein each of the closures includes an adsorber material element, and wherein the chamber is filled with the gas at an elevated pressure sufficient to pre-charge the adsorber material elements with the gas; and dispensing a closure of the plurality from the chamber immediately prior to the sealing, and wherein sealing the container comprises applying the dispensed closure to an opening of the container.

15. The method of claim 1, further comprising:

prior to sealing the container, dosing the container with the gas in liquefied form.

16. The method of claim 1, wherein sealing the container comprises sealing the container with a closure in a chamber pressurized with the gas.

17. The method of claim 1, wherein the at least one adsorber material is selected from the group consisting of zeolites, carbon, carbon nanotubes, and metal organic frameworks.

* * * * *